United States Patent
Xu et al.

(10) Patent No.: US 9,824,213 B2
(45) Date of Patent: Nov. 21, 2017

(54) METHOD AND APPARATUS FOR ASSEMBLING COMPONENT IN ROUTER

(71) Applicant: Tsinghua University, Beijing (CN)

(72) Inventors: Ke Xu, Beijing (CN); Lei Xu, Beijing (CN); Wenlong Chen, Beijing (CN); Meng Shen, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 182 days.

(21) Appl. No.: 14/945,408

(22) Filed: Nov. 18, 2015

(65) Prior Publication Data
US 2016/0140339 A1 May 19, 2016

(30) Foreign Application Priority Data
Nov. 19, 2014 (CN) .......................... 2014 1 0662984

(51) Int. Cl.
*G06F 21/00* (2013.01)
*G06F 21/55* (2013.01)
*G06F 3/06* (2006.01)
*H04L 12/773* (2013.01)
*G06F 17/30* (2006.01)

(52) U.S. Cl.
CPC .......... *G06F 21/554* (2013.01); *G06F 3/0635* (2013.01); *G06F 17/30985* (2013.01); *H04L 45/60* (2013.01)

(58) Field of Classification Search
CPC . G06F 21/554; G06F 3/0635; G06F 17/30985
See application file for complete search history.

(56) References Cited

U.S. PATENT DOCUMENTS

| | | | | |
|---|---|---|---|---|
| 8,023,404 B1* | 9/2011 | Narayanan | .......... | G06F 11/1417 370/216 |
| 8,448,238 B1* | 5/2013 | Gupta | ..................... | H04L 63/08 726/15 |
| 9,167,004 B2* | 10/2015 | Pappu | ................. | H04L 63/1416 |
| 2003/0041170 A1* | 2/2003 | Suzuki | ............... | H04L 12/4675 709/238 |

(Continued)

*Primary Examiner* — Ali Shayanfar
(74) *Attorney, Agent, or Firm* — Kile Park Reed & Houtteman LLC

(57) ABSTRACT

A method and apparatus for assembling a component in a router are provided. The router includes at least one reconfigurable component, the at least one reconfigurable component has a unique function, the method includes: obtaining attribute information of the at least one reconfigurable component in the router, wherein the attribute information comprises information on an importance and/or a using frequency of the at least one reconfigurable component in the router; coding the at least one reconfigurable component based on Huffman Coding to generate a Huffman code according to the attribute information of the at least one reconfigurable component; selecting the at least one reconfigurable component, and assembling the selected reconfigurable component to realize a routing function and to form an assembly code; and generating a routing paradigm table according to a user security requirement and the assembly code, such that the router performs the routing function according to the routing paradigm table.

9 Claims, 3 Drawing Sheets

(56) References Cited

U.S. PATENT DOCUMENTS

| | | | |
|---|---|---|---|
| 2006/0104277 A1* | 5/2006 | Lin | H04L 45/00 370/392 |
| 2006/0106940 A1* | 5/2006 | Jagannathan | H04L 69/16 709/238 |
| 2007/0097976 A1* | 5/2007 | Wood | H04L 63/1416 370/392 |
| 2013/0094856 A1* | 4/2013 | Chen | H04L 45/62 398/48 |
| 2013/0291060 A1* | 10/2013 | Moore | G06F 21/6245 726/1 |
| 2013/0291117 A1* | 10/2013 | Thubert | H04L 63/1458 726/26 |
| 2014/0181968 A1* | 6/2014 | Ge | H04L 63/1425 726/23 |
| 2015/0188848 A1* | 7/2015 | Tran | H04L 49/254 370/390 |
| 2016/0140336 A1* | 5/2016 | Alexander | H04L 63/0846 726/6 |

* cited by examiner

METHOD AND APPARATUS FOR ASSEMBLING COMPONENT IN ROUTER

CROSS-REFERENCE TO RELATED APPLICATION

This application claims priority to and benefits of Chinese Patent Application No. 201410662984.X, filed with the State Intellectual Property Office of P. R. China on Nov. 19, 2014, the entire content of which is incorporated herein by reference.

FIELD

The present disclosure relates to a field of a router, and more particularly relates to a method for assembling a component in a router and an apparatus for assembling a component in a router.

BACKGROUND

A development of a router has always been closed and monopolistic with a long development cycle and a high development cost. A credibility and security of the router is a hot topic in a field of a router research. Security requirements of users on a router may focus on a sender and a receiver, specifically, data sent by the sender may be correctly transferred, and integrated and accurate data may be received by the receiver. According to the above requirements, irregular behaviors in the router can be divided into four kinds: a behavior of transferring incorrectly, a behavior of transferring maliciously, a behavior of discarding abnormally, and a behavior of tampering with data. How to make a behavior of the router to be credible and secure by detecting and monitoring the above irregular conducts becomes an important problem in a design of the router.

SUMMARY

Embodiments of the present disclosure seek to solve at least one of the problems existing in the related art to at least some extent.

Accordingly, a first objective of the present disclosure is to provide a method for assembling a component in a router, which may reduce a development cycle and a development cost of the router and may have a higher credibility and security.

A second objective of the present disclosure is to provide an apparatus for assembling a component in a router.

A third objective of the present disclosure is to provide a non-transitory computer-readable storage medium.

In order to achieve above objectives, embodiments of a first aspect of the present disclosure provides a method for assembling a component in a router, in which the router includes at least one reconfigurable component, the at least one reconfigurable component has a unique function, the method includes:

obtaining attribute information of the at least one reconfigurable component in the router, in which the attribute information comprises information on an importance and/or a using frequency of the at least one reconfigurable component in the router;

coding the at least one reconfigurable component based on Huffman Coding to generate a Huffman code according to the attribute information of the at least one reconfigurable component;

selecting the at least one reconfigurable component, and assembling the selected reconfigurable component to realize a routing function and to form an assembly code; and generating a routing paradigm table according to a user security requirement and the assembly code, such that the router performs the routing function according to the routing paradigm table.

With the method for assembling a component in a router according to embodiments of the present disclosure, the using frequency of the reconfigurable component is considered fully, the router may be constructed on the basis of the reconfigurable component, the credibility and security problem of the router may be solved; in addition, the Huffman coding is introduced in this method, such that the encoding efficiency may be improved and the user's privacy and security may be guaranteed as far as possible without affecting the routing performance. Therefore, this method may reduce the development cost and the development cycle of the router and may have a higher credibility and security.

In some embodiments, the router performs the routing function by steps of: pushing by the router a generated behavior code into the routing paradigm table to match the generated behavior code in the routing paradigm table; performing the routing function if the generated behavior code is successfully matched; giving an alarm if the generated behavior code is unsuccessfully matched.

In some embodiments, giving an alarm if the generated behavior code is unsuccessfully matched includes steps of: obtaining a severity level of an illegal behavior corresponding to the generated behavior code if the generated behavior code is unsuccessfully matched; disabling a reconfigurable component generating the illegal behavior until the reconfigurable component generating the illegal behavior is reactivated by a control layer if the severity level is a first level; sending a warning message to an application layer directly if the severity level is a second level.

In some embodiments, the at least one reconfigurable component has an activate and disable interface such that the control layer controls the at least one reconfigurable component via the activate and disable interface.

In some embodiments, if the attribute information is the information on the using frequency of the at least one reconfigurable component, coding the at least one reconfigurable component by Huffman Coding to generate a Huffman code based on the attribute information of the at least one reconfigurable component includes: A: sequencing the at least one reconfigurable component in descending order according to the using frequency of the at least one reconfigurable component to form a reconfigurable component sequence; B: adding a virtual reconfigurable component with the using frequency equal to 0 into the reconfigurable component sequence; C: combining two reconfigurable components with minimum using frequencies, and constructing a binary tree by defining the two reconfigurable components with minimum using frequencies as two leaves of the binary tree, in which a using frequency of a root node of the binary tree is a sum of using frequencies of leaves of the binary tree; D: adding the root node as a reconfigurable component into the reconfigurable component sequence; E: repeating steps C and D until only one reconfigurable component is in the reconfigurable component sequence, such that a Huffman tree is generated, in which all reconfigurable components are defined as leaves of the Huffman tree; F: defining codes of all left branches of the Huffman tree as 0 and codes of all right branches of the Huffman tree as 1; G: generating the Huffman code of a reconfigurable component corresponding to a leaf of the Huffman tree by combining codes of branches in a path from the root node to the leaf.

In order to achieve the above objectives, embodiments of a second aspect of the present disclosure provides an apparatus for assembling a component in a router, in which the router includes at least one reconfigurable component, the at least one reconfigurable component has a unique function, the apparatus includes: an obtaining module, configured to obtain attribute information of the at least one reconfigurable component in the router, in which the attribute information comprises information on an importance and/or a using frequency of the at least one reconfigurable component in the router; a coding module, configured to code the at least one reconfigurable component based on Huffman Coding to generate a Huffman code according to the attribute information of the at least one reconfigurable component; an assembling module, configured to select the at least one reconfigurable component and assemble the selected reconfigurable component to realize a routing function and to form an assembly code; a generating module, configured to generate a routing paradigm table according to a user security requirement and the assembly code, such that the router performs the routing function according to the routing paradigm table.

With the apparatus for assembling a component in a router according to embodiments of the present disclosure, the using frequency of the reconfigurable component is considered fully, the router may be constructed on the basis of the reconfigurable component, the credibility and security problem of the router may be solved; in addition, the Huffman coding is introduced in this method, such that the encoding efficiency may be improved and the user's privacy and security may be guaranteed as far as possible without affecting the routing performance. Therefore, this method may reduce the development cost and the development cycle of the router and may have a higher credibility and security.

In some embodiments, the apparatus further includes a matching module, configured to push a generated behavior code into the routing paradigm table to match the generated behavior code in the routing paradigm table; a perform module, configured to perform the routing function if the generated behavior code is successfully matched; a warning module, configured to giving an alarm if the generated behavior code is unsuccessfully matched.

In some embodiments, the warning module is configured to give an alarm if the generated behavior code is unsuccessfully matched by steps of: obtaining a severity level of an illegal behavior corresponding to the generated behavior code if the generated behavior code is unsuccessfully matched; disabling a reconfigurable component generating the illegal behavior until the reconfigurable component generating the illegal behavior is reactivated by a control layer if the severity level is a first level; sending a warning message to an application layer directly if the severity level is a second level.

In some embodiments, the at least one reconfigurable component has an activate and disable interface such that the control layer controls the at least one reconfigurable component via the activate and disable interface.

In some embodiments, if the attribute information is the information on the using frequency of the at least one reconfigurable component, the coding module is configured to code the at least one reconfigurable component based on Huffman Coding to generate a Huffman code according to the attribute information of the at least one reconfigurable component by steps of:

A: sequencing the at least one reconfigurable component in descending order according to the using frequency of the at least one reconfigurable component to form a reconfigurable component sequence;

B: adding a virtual reconfigurable component with the using frequency equal to 0 into the reconfigurable component sequence;

C: combining two reconfigurable components with minimum using frequencies, and constructing a binary tree by defining the two reconfigurable components with minimum using frequencies as two leaves of the binary tree, in which a using frequency of a root node of the binary tree is a sum of using frequencies of leaves of the binary tree;

D: adding the root node as a reconfigurable component into the reconfigurable component sequence;

E: repeating steps C and D until only one reconfigurable component is in the reconfigurable component sequence, such that a Huffman tree is generated, in which all reconfigurable components are defined as leaves of the Huffman tree;

F: defining codes of all left branches of the Huffman tree as 0 and codes of all right branches of the Huffman tree as 1;

G: generating the Huffman code of a reconfigurable component corresponding to a leaf of the Huffman tree by combining codes of branches in a path from the root node to the leaf.

In order to achieve the above objectives, embodiments of a third aspect of the present disclosure provide a non-transitory computer-readable storage medium having stored therein instructions that, when executed by a processor of a terminal, causes the terminal to perform a method for assembling a component in a router, in which the router comprises at least one reconfigurable component, the at least one reconfigurable component has a unique function, the method includes:

obtaining attribute information of the at least one reconfigurable component in the router, in which the attribute information comprises information on an importance and/or a using frequency of the at least one reconfigurable component in the router;

coding the at least one reconfigurable component based on Huffman Coding to generate a Huffman code according to the attribute information of the at least one reconfigurable component;

selecting the at least one reconfigurable component, and assembling the selected reconfigurable component to realize a routing function and to form an assembly code; and generating a routing paradigm table according to a user security requirement and the assembly code, such that the router performs the routing function according to the routing paradigm table.

Additional aspects and advantages of embodiments of present disclosure will be given in part in the following descriptions, become apparent in part from the following descriptions, or be learned from the practice of the embodiments of the present invention.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
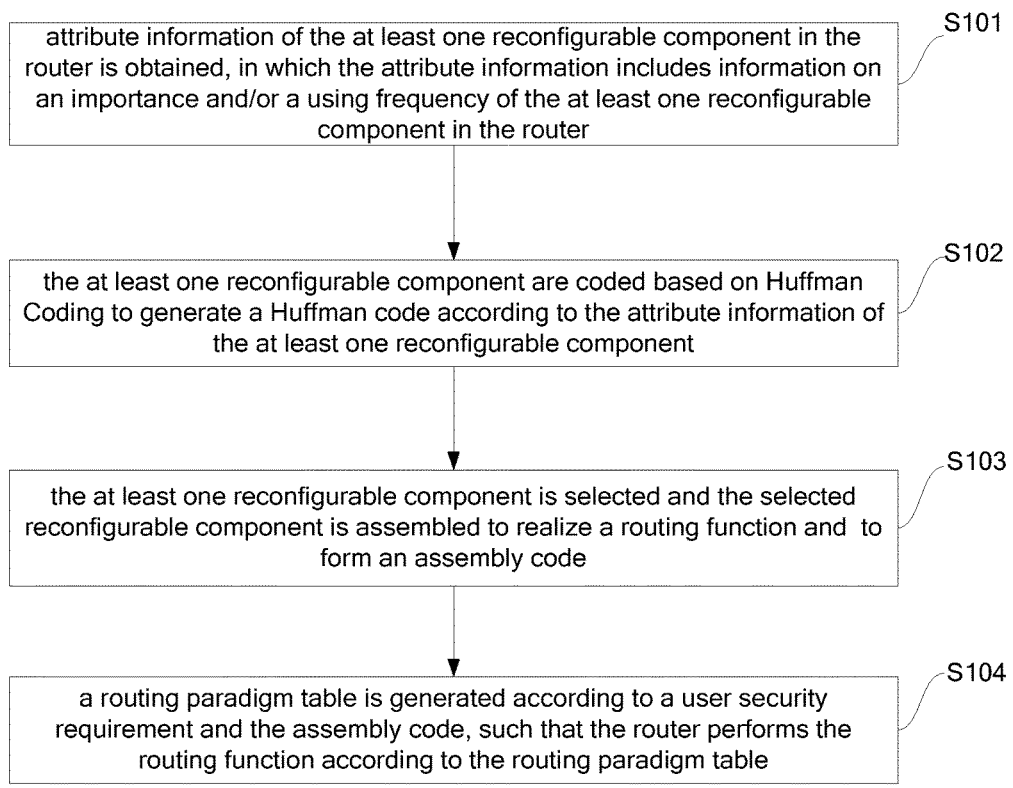
FIG. 1 is a flow chart showing a method for assembling a component in a router according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In addition, terms such as "first" and "second" are used herein for purposes of description and are not intended to indicate or imply relative importance or significance. Thus, the feature defined with "first" and "second" may comprise one or more this feature. In the description of the present disclosure, the term "a plurality of" means two or more than two, unless specified otherwise.

In the following, a method for assembling a component in a router and an apparatus for assembling a component in a router according to embodiments of the present disclosure will be described in detail with reference to the drawings.

Figure 2:
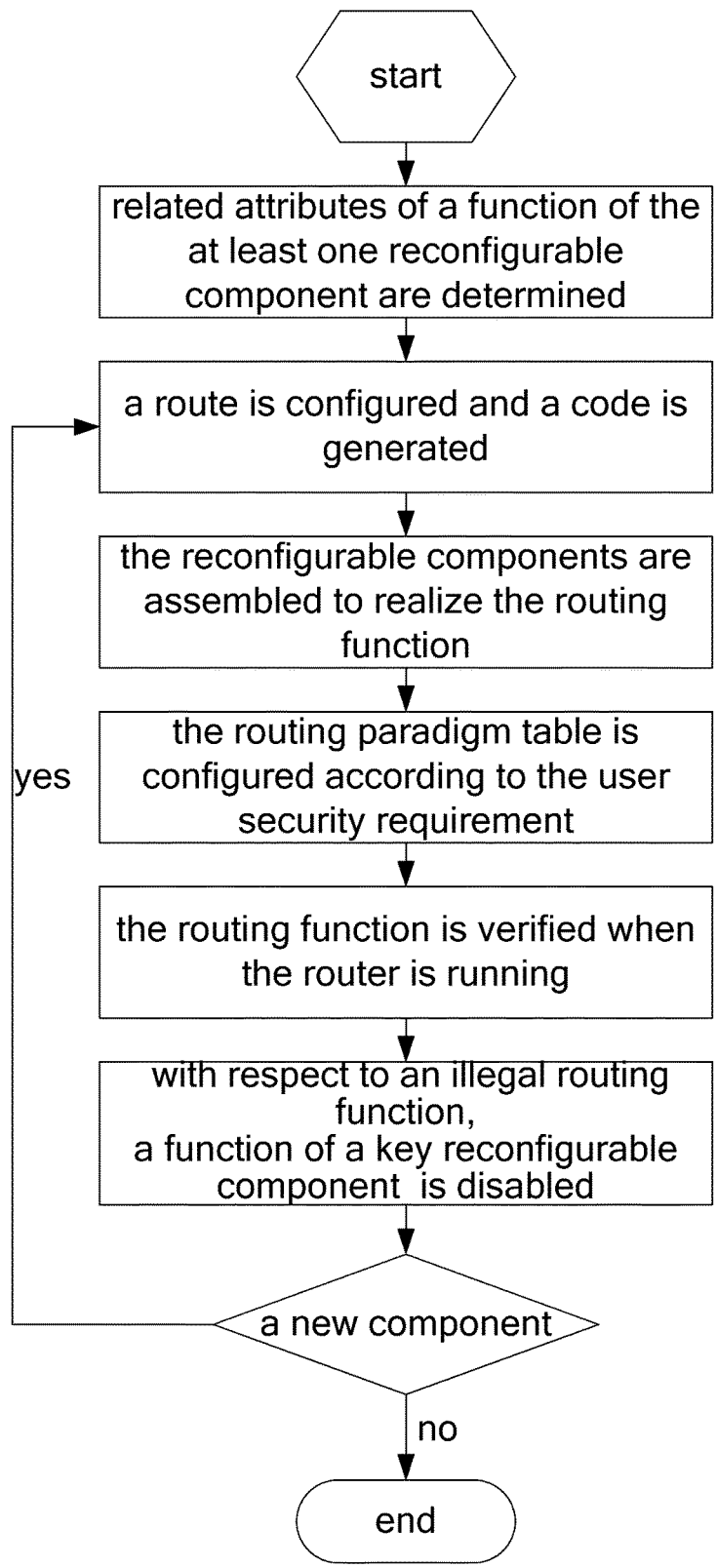
FIG. 2 is a flow chart showing a method for assembling a component in a router according to another embodiment of the present disclosure.

FIG. 1 is the flow chart showing a method for assembling a component in a router according to an embodiment of the present disclosure. FIG. 2 is the flow chart showing a method for assembling a component in a router according to another embodiment of the present disclosure. The router includes at least one reconfigurable component, and each reconfigurable component has a unique function. With a combination of FIG. 1 and FIG. 2, the method includes following steps.

In step S101, attribute information of the at least one reconfigurable component in the router is obtained, in which the attribute information includes information on an importance and/or a using frequency of the at least one reconfigurable component in the router.

In other words, related attributes of a function of the at least one reconfigurable component (i.e. the routing component) may be determined in this step. Specifically, the importance and/or the using frequency of the at least one reconfigurable component in the router are determined to prepare for a next step of Huffman encoding. A using frequency of a reconfigurable component is defined as a ratio of the frequency of calling this reconfigurable component to the frequency of calling the routing function of the router. Each reconfigurable component is a basic element, which can only realize a unique function but cannot realize a plurality of functions at the same time. Since the function of each reconfigurable component is simple, a third party vendor may verify each reconfigurable component to prevent a fraud of each reconfigurable component. There are flexible interfaces between reconfigurable components, and a signal will be pushed by a reconfigurable component to push a binary signal of this reconfigurable component into a control layer once a routing function is performed by this reconfigurable component, and a coding of the binary signal may be implemented in a subsequent step.

In step S102, the at least one reconfigurable component are coded based on Huffman Coding to generate a Huffman code according to the attribute information of the at least one reconfigurable component.

In other words, a route is configured and a code is generated in this step.

In some embodiments, if the attribute information is the information on the using frequency of the at least one reconfigurable component, step S102 includes: A: sequencing the at least one reconfigurable component in descending order according to the using frequency of the at least one reconfigurable component to form a reconfigurable component sequence; B: adding a virtual reconfigurable component with the using frequency equal to 0 into the reconfigurable component sequence; C: combining two reconfigurable components with minimum using frequencies, and constructing a binary tree by defining the two reconfigurable components with minimum using frequencies as two leaves of the binary tree, in which a using frequency of a root node of the binary tree is a sum of using frequencies of leaves of the binary tree; D: adding the root node as a reconfigurable component into the reconfigurable component sequence; E: repeating steps C and D until only one reconfigurable component is in the reconfigurable component sequence, such that a Huffman tree is generated, in which all reconfigurable components are defined as leaves of the Huffman tree; F: defining codes of all left branches of the Huffman tree as 0 and codes of all right branches of the Huffman tree as 1; G: generating the Huffman code of a reconfigurable component corresponding to a leaf of the Huffman tree by combining codes of branches in a path from the root node to the leaf. In addition, since the Huffman code of each reconfigurable component is unique and invariant, considering that a reconfigurable component may be added into the reconfigurable component sequence to realize the routing function at any time and that the function of the component is invariant, a reconfigurable component corresponding to a longest known path (i.e. the virtual reconfigurable component with the using frequency equal to 0) in the Huffman tree is split to obtain split leaf nodes, a split leaf node is assigned to a new reconfigurable component and another split leaf node is defined as the virtual reconfigurable component.

In step S103, the at least one reconfigurable component is selected and the selected reconfigurable component is assembled to realize a routing function and to form an assembly code.

In other words, the routing components (i.e. the reconfigurable components) are assembled to realize the routing function in this step. Specifically, a hardware mode of assembling reconfigurable components is determined by the third party vendor, but interfaces for pushing signals of these reconfigurable components are required to be accessed into the control layer, and interface calling parameters between these reconfigurable components are behavior code caches assigned by the control layer. A reconfigurable component pushes its code signal into an assigned code cache after performing its function. Once a routing behavior is finished, behavior codes in the behavior code caches may be pushed into a configured routing paradigm table to match the behavior codes in the configured routing paradigm table. It should be noted that the routing behavior is performed and the behavior codes are matched, if an illegal behavior occurs, an alarm may be given.

In step S104, a routing paradigm table is generated according to a user security requirement and the assembly code, such that the router performs the routing function according to the routing paradigm table.

In other words, the routing paradigm table is configured according to the user security requirement based on the assembly code. The routing paradigm table is defined according to legal behaviors and the assembly code before the routing function (for example, transferring a data packet normally, updating a routing table, etc.) is performed. These codes of reconfigurable components needed by the legal behaviors constitute the routing paradigm table, and the routing paradigm table is stored in a cache for matching behavior codes. A function of a reconfigurable component may be disabled according to the routing paradigm table, if an illegal behavior occurs, a disable signal may be sent to a reconfigurable component corresponding to the illegal behavior directly, and the reconfigurable component will no longer perform its function until it is reactivated according to an inform from the control layer.

In some embodiments, when the router performs the routing function, the security of the routing function is verified firstly. Specifically, when the router performs a routing function, the router first pushes a generated behavior code into the routing paradigm table to match the generated behavior code in the routing paradigm table. If the generated behavior code indicates a legal behavior, the generated behavior code is successfully matched and the router performs the routing function. If the generated behavior code indicates an illegal behavior, the generated behavior code is unsuccessfully matched, an alarm is given. Furthermore, the routing paradigm table may generate two different behaviors according to a severity level of the illegal behavior, and different actions may be generated according to the tow different behaviors based on the severity level. Specifically, the routing paradigm table first obtains a severity level of the illegal behavior, and disables a reconfigurable component generating the illegal behavior until the control layer reactivates the reconfigurable component generating the illegal behavior if the severity level is a first level, and sends a warning message to an application layer directly if the severity level is a second level.

In addition, in some embodiments, with respect to an illegal routing function, a function of a key reconfigurable component is disabled and a message may be pushed into the control layer. Each reconfigurable component has an activate and disable interface such that the control layer controls each reconfigurable component via the activate and disable interface. The routing paradigm table may send a disable signal to a reconfigurable component to disable this reconfigurable component. In addition, the routing paradigm table may send a warning message to the control layer. And an activation signal sent by the control layer is required to activate this reconfigurable component, and this reconfigurable component may perform its function normally after receiving the activation signal.

If there is a new reconfigurable component requiring to be added into the router, it is returned to step S102, as shown in FIG. 2. The new reconfigurable component or a new routing function may be added into the router by performing step S102 after being verified by the third party vendor. Adding the new reconfigurable component refers to updating hardware of the router, so the router needs to be paused. But if the new reconfigurable component is realized by software, the new reconfigurable component may be added into the router in real time in a situation that the router performs its function normally.

Figure 3:
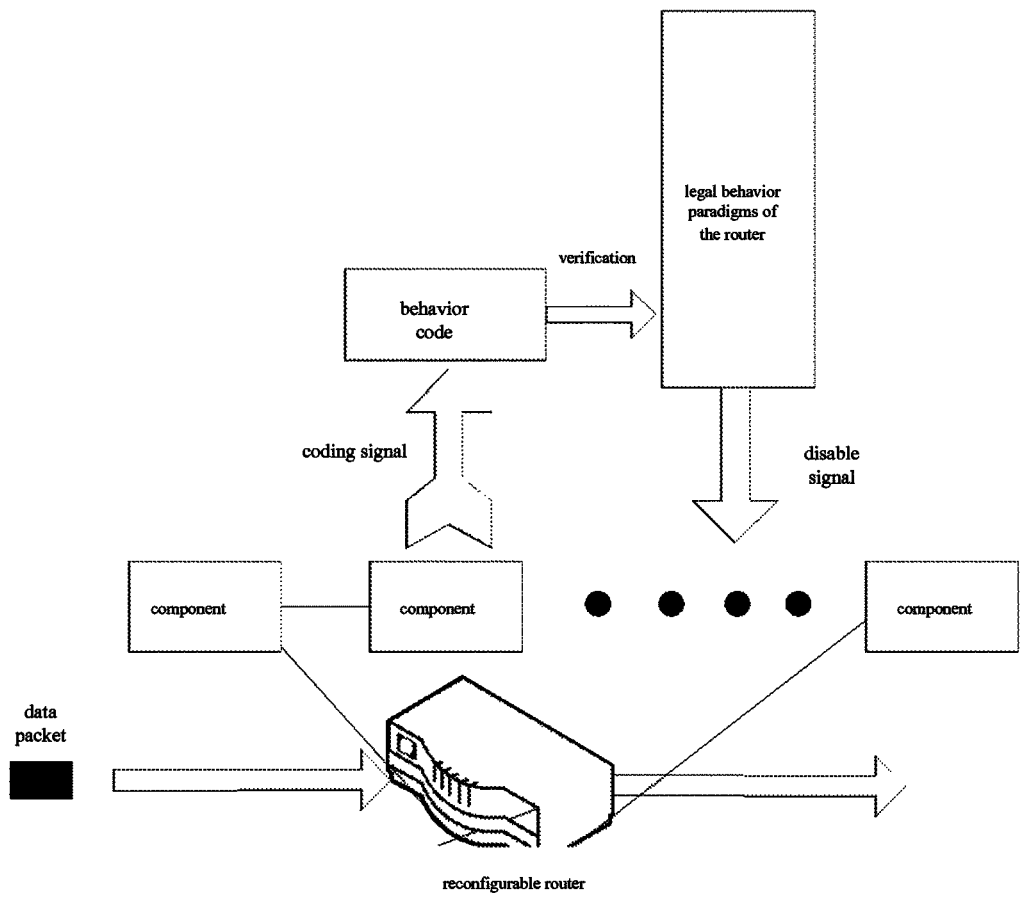
FIG. 3 is a flow chart illustrating a method for assembling a component in a router according to an embodiment of the present disclosure.

In summary, referring to FIG. 3, with the method according to embodiments of the present disclosure, a secure and reliable routing function may be realized based on the routing behavior. Firstly, the router includes reconfigurable components, each reconfigurable component may realize only one unique function, which may be a function of transferring, a function of updating a routing table, a function of losing a packet, a function of generating a data packet by itself, a function of changing a source IP in a header, a function of changing an object IP in the header, a function of changing a payload of a data packet, or a function of verifying, etc. The function of each reconfigurable component is verified by the third party vendor. Since the function of each reconfigurable component is simple, so it is easy to verify the function by the third party vendor. At the same time, a new reconfigurable component may be added into the router after being verified by the third party vendor. And then, according to a using frequency of each reconfigurable component, each reconfigurable component may be coded based on Huffman coding to obtain a Huffman code corresponding to each reconfigurable component. After adding the new reconfigurable component, the Huffman code may be extended simply and directly. Since the using frequency of the new reconfigurable component is very low, a use of a longer component code has a little effect on the encoding efficiency of the overall Huffman code. In addition, a secure routing function may be realized according to the routing behavior based on the routing paradigm, and an illegal behavior may be disabled in the fastest time for an illegal routing. Moreover, if a routing component is refined, such as a first refined routing component is configured to receive a at a first port, and a second refined routing component is configured to transfer the packet to a second port, this encoding method may build a behavior of the entire network to provide a good means for predicting the network security.

In the following, the method for assembling a reconfigurable component in a router according to embodiments of the present disclosure will be described with reference to a particular example.

As the particular example, assuming that there are 17 reconfigurable components, each reconfigurable component has a unique function verified by the third party vendor. In addition, each reconfigurable component has an activate and disable interface and a signal push interface. A using frequency of each reconfigurable component may be shown in table 1.

TABLE 1

| function | transferring to an output port | updating a routing table | losing a packet | generating a data packet by itself | changing a source ip in a header | changing an object ip in the header | changing a payload of a data packet | verifying whether a data packet is correct | updating a routing table manually |
|---|---|---|---|---|---|---|---|---|---|
| using frequency | 0.13 | 0.1 | 0.03 | 0.1 | 0.025 | 0.025 | 0.05 | 0.08 | 0.05 |

| function | querying a routing table | copying a data packet | judging whether a buffer queue is full | receiving a data packet | changing a source mac | changing an object mac | verifying whether a data packet is incorrect | reading a data packet | virtual component |
|---|---|---|---|---|---|---|---|---|---|
| using frequency | 0.11 | 0.05 | 0.02 | 0.11 | 0.05 | 0.05 | 0.01 | 0.01 | 0 |

A binary code is configured for each reconfigurable component based on Huffman Coding according to the using frequency of each reconfigurable component shown in table 1, a Huffman code of each reconfigurable component may be shown in table 2.

TABLE 2

| function | transferring to an output port | updating a routing table | losing a packet | generating a data packet by itself | changing a source ip in a header | changing an object ip in the header | changing a payload of a data packet | verifying whether a data packet is correct | updating a routing table manually |
|---|---|---|---|---|---|---|---|---|---|
| Huffman Code | 010 | 101 | 00111 | 110 | 000110 | 000111 | 110 | 0010 | 1111 |

| function | querying a routing table | copying a data packet | judging whether a buffer queue is full | receiving a data packet | changing a source mac | changing an object mac | verifying whether a data packet is incorrect | reading a data packet | virtual component |
|---|---|---|---|---|---|---|---|---|---|
| Huffman Code | 011 | 00000 | 001100 | 100 | 00001 | 00010 | 0011010 | 00110111 | 00110110 |

Further, after the uniqueness and the correctness of each reconfigurable component are verified by the third party vendor, the binary code may be assigned to each reconfigurable component based on the Huffman Code. When a router including these legal reconfigurable components is running, if a function of a reconfigurable component is performed, the reconfigurable component may submit its binary code to the control layer. According to an order that functions of reconfigurable components are performed, binary codes of the reconfigurable components may be combined into a long code (called a behavior code). Since the router may receive data from many ports and may generate a plurality of behavior codes at the same time, it is required to allocate a cache to the plurality of behavior codes. Since the routing paradigm table is static and read-only, the plurality of behavior codes may be matched in the routing paradigm table in parallel.

According to a behavior paradigm specified by the user, a legal paradigm of the router is defined according to the plurality of behavior codes in this example. The routing paradigm table is stored in read-only cache and is configured to match the plurality of behavior codes. And simple behavior paradigms may be configured in advance, a few simple behavior paradigms in this example are shown in table 3.

TABLE 3

| legal behavior | legal behavior paradigm of the router |
|---|---|
| receiving a data packet - querying a routing table - changing a source mac- verifying whether a data packet is correct - transferring to an output port | 100-011-000110-000111-0010-010 |
| receiving a data packet - updating a routing table - losing a packet | 100-101-00111 |
| generating a data packet by itself - verifying whether a data packet is correct - transferring to an output port | 110-0010-010 |

In some examples, illegal behavior paradigms also may be configured in advance, a few simple illegal behavior paradigms in this example are shown in table 4.

TABLE 4

| illegal behavior | illegal behavior paradigm of the router |
|---|---|
| updating a routing table manually | 1111 |
| receiving a data packet - querying a routing table - changing a source mac- verifying whether a data packet is correct - copying a data packet -transferring to an output port | 100-011-0010-00000-010-010 |
| receiving a data packet - losing a data packet | 100-00111 |
| receiving a data packet - querying a routing table - changing a payload of a data packet - verifying whether a data packet is correct-transferring to an output port | 100-011-1110-0010-010 |
| receiving a data packet - reading a data packet | 100-00110111 |

It should be understood that, a behavior code generated when the router performs one routing function may be matched with the legal behavior paradigms of the router, only a legal behavior can be performed, otherwise the router may give an alarm to the control layer indicating that an illegal behavior occurs or even disable a corresponding reconfigurable component until the corresponding reconfigurable component is automatically recovered after a fixed time period or is manually recovered by an administrator. The routing behavior is motivated by the behavior of the reconfigurable component and a grain size of processing is a packet. Therefore, although the router may get away with performing a routing behavior not matching with a legal paradigm at a first time, follow-up routing behaviors cannot be performed due to a disabled reconfigurable component. Thus, this method may enhance the credibility of the router.

With the method for assembling a component in a router according to embodiments of the present disclosure, the using frequency of the reconfigurable component is considered fully, the router may be constructed on the basis of the reconfigurable component, the credibility and security problem of the router may be solved; in addition, the Huffman coding is introduced in this method, such that the encoding efficiency may be improved and the user's privacy and security may be guaranteed as far as possible without affecting the routing performance. Therefore, this method may reduce the development cost and the development cycle of the router and may have a higher credibility and security.

An apparatus for assembling a component in a router according to embodiments of the present disclosure is provided.

Figure 4:
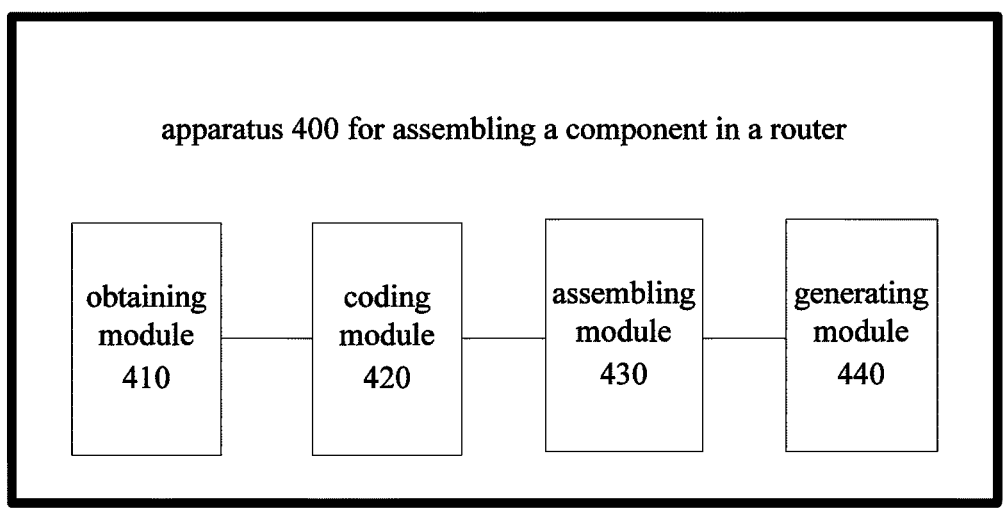
FIG. 4 is a block diagram illustrating an apparatus for assembling a component in a router according to an embodiment of the present disclosure.

FIG. 4 is the block diagram illustrating an apparatus for assembling a component in a router according to an embodiment of the present disclosure. The router includes at least one reconfigurable component, and the at least one reconfigurable component has a unique function. As shown in FIG. 4, the apparatus 400 includes an obtaining module 410, a coding module 420, an assembling module 430 and a generating module 440.

Specifically, the obtaining module 410 is configured to obtain attribute information of the at least one reconfigurable component in the router, in which the attribute information includes information on an importance and/or a using frequency of the at least one reconfigurable component in the router.

In other words, related attributes of a function of the at least one reconfigurable component (i.e. the routing component) may be determined in this step. Specifically, the importance and/or the using frequency of the at least one reconfigurable component in the router are determined to prepare for a next step of Huffman encoding. A using frequency of a reconfigurable component is defined as a ratio of the frequency of calling this each reconfigurable component to the frequency of calling the routing function of the router. Each reconfigurable component is a basic element, which can only realize a unique function but cannot realize a plurality of functions at the same time. Since the function of each reconfigurable component is simple, a third party vendor may verify each reconfigurable component to prevent a fraud of each reconfigurable component. There are flexible interfaces between reconfigurable components, and a signal will be pushed by a reconfigurable component to push a binary signal of this reconfigurable component into a control layer once a routing function is performed by this reconfigurable component, and a coding of the binary signal may be implemented in a subsequent step.

The coding module 420 is configured to code the at least one reconfigurable component based on Huffman Coding to generate a Huffman code according to the attribute information of the at least one reconfigurable component.

In other words, a route is configured and a code is generated in this step.

In some embodiments, if the attribute information is the information on the using frequency of the at least one reconfigurable component, the coding module 420 is configured to code the at least one reconfigurable component based on Huffman Coding to generate a Huffman code according to the attribute information of the at least one reconfigurable component by steps of: A: sequencing the at least one reconfigurable component in descending order according to the using frequency of the at least one reconfigurable component to form a reconfigurable component sequence; B: adding a virtual reconfigurable component with the using frequency equal to 0 into the reconfigurable component sequence; C: combining two reconfigurable components with minimum using frequencies, and constructing a binary tree by defining the two reconfigurable components with minimum using frequencies as two leaves of the binary tree, in which a using frequency of a root node of the binary tree is a sum of using frequencies of leaves of the binary tree; D: adding the root node as a reconfigurable component into the reconfigurable component sequence; E: repeating steps C and D until only one reconfigurable component is in the reconfigurable component sequence, such that a Huffman tree is generated, in which all reconfigurable components are defined as leaves of the Huffman tree; F: defining codes of all left branches of the Huffman tree as 0 and codes of all right branches of the Huffman tree as 1; G: generating the Huffman code of a reconfigurable component corresponding to a leaf of the Huffman tree by combining codes of branches in a path from the root node to the leaf. In addition, since the Huffman code of each reconfigurable component is unique and invariant, considering that a reconfigurable component may be added into the reconfigurable component sequence to realize the routing function at any time and that the function of the component is invariant, a reconfigurable component corresponding to a longest known path (i.e. the virtual reconfigurable component with the using frequency equal to 0) in the Huffman tree is split to obtain split leaf nodes, a split leaf node is assigned to a new reconfigurable component and another split leaf node is defined as the virtual reconfigurable component.

The assembling module 430 is configured to select at least one reconfigurable component and assemble selected reconfigurable component to realize a routing function and to form an assembly code.

In other words, the routing components (i.e. the reconfigurable components) are assembled to realize the routing function in this step. Specifically, a hardware mode of assembling reconfigurable components is determined by the third party vendor, but interfaces for pushing signals of these reconfigurable components are required to be accessed into the control layer, and interface calling parameters between these reconfigurable components are behavior code caches assigned by the control layer. A reconfigurable component pushes its code signal into an assigned code cache after performing its function. Once a routing behavior is finished, behavior codes in the behavior code caches may be pushed into a configured routing paradigm table to match the behavior codes in the configured routing paradigm table. It should be noted that the routing behavior is performed as the behavior codes are matched, if an illegal behavior occurs, an alarm may be given.

The generating module 440 is configured to generate a routing paradigm table according to a user security requirement and the assembly code, such that the router performs the routing function according to the routing paradigm table.

In other words, the routing paradigm table is configured according to the user security requirement based on the assembly code. The routing paradigm table is defined according to legal behaviors and the assembly code before the routing function (for example, transferring a data packet normally, updating a routing table, etc.) is performed These codes of reconfigurable components needed by the legal behaviors constitute the routing paradigm table, and the routing paradigm table is stored in a cache for matching behavior codes. A function of a reconfigurable component may be disabled according to the routing paradigm table, if an illegal behavior occurs, a disable signal may be sent to a reconfigurable component corresponding to the illegal behavior directly, and the reconfigurable component will no longer perform its function until it is reactivated according to an inform from the control layer.

In some embodiments, the apparatus further includes a matching module, a perform module and a warning module (not shown in Fig. X). The matching module is configured to push a generated behavior code into the routing paradigm table to match the generated behavior code in the routing paradigm table. The perform module is configured to perform the routing function if the generated behavior code is successfully matched. The warning module is configured to giving an alarm if the generated behavior code is unsuccessfully matched. Furthermore, the routing paradigm table may generate two different behaviors according to a severity level of an illegal behavior, and different actions may be generated according to the tow different behaviors based on the severity level. Specifically, the warning module is configured to give an alarm if the generated behavior code is unsuccessfully matched by steps of: obtaining a severity level of an illegal behavior if the generated behavior code is unsuccessfully matched; disabling a reconfigurable component generating the illegal behavior until the reconfigurable component generating the illegal behavior is reactivated by a control layer if the severity level is a first level; sending a warning message to an application layer directly if the severity level is a second level.

In addition, in some embodiments, with respect to an illegal routing function, a function of a key reconfigurable component is disabled and a message may be pushed into the control layer. Each reconfigurable component has an activate and disable interface such that the control layer controls each reconfigurable component via the activate and disable interface. The routing paradigm table may send a disable signal to a reconfigurable component to disable this reconfigurable component. In addition, the routing paradigm table may send a warning message to the control layer. And an activation signal sent by the control layer is required to activate this reconfigurable component, and this reconfigurable component may perform its function normally after receiving the activation signal.

If there is a new reconfigurable component requiring to be added into the router, it is returned to the coding module 420. The new reconfigurable component or a new routing function may be added into the router by the coding module 420 after being verified by the third party vendor. Adding the new reconfigurable component refers to updating hardware of the router, so the router needs to be paused. But if the new reconfigurable component is realized by software, the new reconfigurable component may be added into the router in real time in a situation that the router performs its function normally.

In summary, referring to FIG. 3, with the apparatus according to embodiments of the present disclosure, a secure and reliable routing function may be realized based on the routing behavior. Firstly, the router includes reconfigurable components, each reconfigurable component may realize only one unique function, which may be a function of transferring, a function of updating a routing table, a function of losing a packet, a function of generating a data packet by itself, a function of changing a source IP in a header, a function of changing an object IP in the header, a function of changing a payload of a data packet, or a function of verifying, etc. The function of each reconfigurable component is verified by the third party vendor. Since the function of each reconfigurable component is simple, so it is easy to verify the function by the third party vendor. At the same time, a new reconfigurable component may be added into the router after being verified by the third party vendor. And then, according to a using frequency of each reconfigurable component, each reconfigurable component may be coded based on the Huffman coding to obtain a Huffman code corresponding to each reconfigurable component. After adding the new reconfigurable component, the Huffman code may be extended simply and directly. Since the using frequency of the new reconfigurable component is very low, a use of a longer component code has a little effect on the encoding efficiency of the overall Huffman code. In addition, a secure routing function may be realized according to the routing behavior based on the routing paradigm, and an illegal behavior may be disabled in the fastest time for an illegal routing. Moreover, if a routing component is refined, such as a first refined routing component is configured to receive a at a first port, and a second refined routing component is configured to transfer the packet to a second port is another routing component, this encoding method may build a behavior of the entire network to provide a good means for predicting the network security.

Concerning the detailed description of a specific example of the apparatus 400, reference is made to embodiments corresponding to the method for assembling a component in a router, which are not elaborated herein again.

With the apparatus for assembling a component in a router according to embodiments of the present disclosure, the using frequency of the reconfigurable component is considered fully, the router may be constructed on the basis of the reconfigurable component, the credibility and security problem of the router may be solved; in addition, the Huffman coding is introduced in this method, such that the encoding efficiency may be improved and the user's privacy and security may be guaranteed as far as possible without affecting the routing performance. Therefore, this method may reduce the development cost and the development cycle of the router and may have a higher credibility and security.

In the following, a non-transitory computer-readable storage medium according to embodiments of the present disclosure will be described in detail.

In some embodiments, the non-transitory computer-readable storage medium having stored therein instructions that, when executed by a processor of a terminal, causes the terminal to perform a method for assembling a component in a router for running an application program, in which the method for assembling a component in a router for running is according to the above embodiments of the present disclosure.

Any process or method described in the flowing diagram or other means may be understood as a module, segment or portion including one or more executable instruction codes of the procedures configured to achieve a certain logic function or process, and the preferred embodiments of the present disclosure include other performances, in which the performance may be achieved in other orders instead of the order shown or discussed, such as in a almost simultaneous way or in an opposite order, which should be appreciated by those having ordinary skills in the art to which embodiments of the present disclosure belong.

The logic and/or procedures indicated in the flowing diagram or described in other means herein, such as a constant sequence table of the executable code for performing a logical function, may be implemented in any computer readable storage medium so as to be adopted by the code execution system, the device or the equipment (such a system based on the computer, a system including a processor or other systems fetching codes from the code execution system, the device and the equipment, and executing the codes) or to be combined with the code execution system, the device or the equipment to be used. With respect to the description of the present invention, "the computer readable storage medium" may include any device including, storing, communicating, propagating or transmitting program so as to be used by the code execution system, the device and the equipment or to be combined with the code execution system, the device or the equipment to be used. The computer readable medium includes specific examples (a non-exhaustive list): the connecting portion (electronic device) having one or more arrangements of wire, the portable computer disc cartridge (a magnetic device), the random access memory (RAM), the read only memory (ROM), the electrically programmable read only memory (EPROMM or the flash memory), the optical fiber device and the compact disk read only memory (CDROM). In addition, the computer readable storage medium even may be papers or other proper medium printed with program, as the papers or the proper medium may be optically scanned, then edited, interpreted or treated in other ways if necessary to obtain the program electronically which may be stored in the computer memory.

It should be understood that, each part of the present disclosure may be implemented by the hardware, software, firmware or the combination thereof. In the above embodiments of the present invention, the plurality of procedures or methods may be implemented by the software or hardware stored in the computer memory and executed by the proper code execution system. For example, if the plurality of procedures or methods is to be implemented by the hardware, like in another embodiment of the present invention, any one of the following known technologies or the combination thereof may be used, such as discrete logic circuits having logic gates for implementing various logic functions upon an application of one or more data signals, application specific integrated circuits having appropriate logic gates, programmable gate arrays (PGA), field programmable gate arrays (FPGA).

It can be understood by those having the ordinary skills in the related art that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The non-transitory computer-readable storage medium may be, but is not limited to, read-only memories, magnetic disks, or optical disks.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for assembling a component in a router, wherein the router comprises at least one reconfigurable component, the at least one reconfigurable component has a unique function, the method comprises steps of:
   obtaining attribute information of the at least one reconfigurable component in the router, wherein the attribute information comprises information on an importance and/or a using frequency of the at least one reconfigurable component in the router;
   coding the at least one reconfigurable component based on Huffman Coding to generate a selecting the at least one reconfigurable component, and assembling the selected reconfigurable component to realize a routing function and to form an assembly code; and
   generating a routing paradigm table according to a user security requirement and the assembly code, resulting the router performs the routing function according to the routing paradigm table;
   determining that the attribute information is the information on the using frequency of the at least one reconfigurable component, wherein coding the at least one reconfigurable component comprises:
   A: sequencing the at least one reconfigurable component in descending order according to the using frequency of the at least one reconfigurable component to form a reconfigurable component sequence;
   B: adding a virtual reconfigurable component with the using frequency equal to 0 into the reconfigurable component sequence;
   C: combining two reconfigurable components with minimum using frequencies and constructing a binary tree by defining the two reconfigurable components with the minimum using frequencies as two leaves of the binary tree, wherein a using frequency of a root node of the binary tree is a sum of using frequencies of leaves of the binary tree;
   D: adding the root node as a reconfigurable component into the reconfigurable component sequence;
   E: repeating steps C and D until only one reconfigurable component is in the reconfigurable component sequence, resulting a Huffman tree being generated, wherein all reconfigurable components are defined as leaves of the Huffman tree;
   F: defining codes of all left branches of the Huffman tree as 0 and codes of all right branches of the Huffman tree as 1; and
   G: generating the Huffman code of a reconfigurable component corresponding to a leaf of the Huffman tree by combining codes of branches in a path from the root node to the leaf.

2. The method according to claim 1, wherein the router performs the routing function by steps of:
   pushing by the router a generated behavior code into the routing paradigm table to match the generated behavior code in the routing paradigm table;
   performing the routing function if the generated behavior code is successfully matched;
   giving an alarm if the generated behavior code is unsuccessfully matched.

3. The method according to claim 2, wherein giving an alarm if the generated behavior code is unsuccessfully matched comprises steps of:
   obtaining a severity level of an illegal behavior corresponding to the generated behavior code if the generated behavior code is unsuccessfully matched;
   disabling a reconfigurable component generating the illegal behavior until the reconfigurable component generating the illegal behavior is reactivated by a control layer if the severity level is a first level;

sending a warning message to an application layer directly if the severity level is a second level.

4. The method according to claim 3, wherein the at least one reconfigurable component has an activate and disable interface resulting the control layer controls the at least one reconfigurable component via the activate and disable interface.

5. An apparatus for assembling a component in a router, wherein the router comprises at least one reconfigurable component, the at least one reconfigurable component has a unique function, the apparatus comprises:

a first hardware computer processor, a second hardware computer processor, a third hardware computer processor and a fourth hardware computer processor;

an obtaining module, executed by the first hardware computer processor, configured to obtain attribute information of the at least one reconfigurable component in the router, wherein the attribute information comprises information on an importance and/or a using frequency of the at least one reconfigurable component in the router;

a coding module, executed by the second hardware computer processor, configured to code the at least one reconfigurable component based on Huffman Coding to generate a Huffman code according to the attribute information of the at least one reconfigurable component;

an assembling module, executed by the third hardware computer processor, configured to select the at least one reconfigurable component and to assemble the selected reconfigurable component such as to realize a routing function and to form an assembly code; and a generating module, executed by the forth hardware computer processor, configured to generate a routing paradigm table according to a user security requirement and the assembly code, resulting the router performs the routing function according to the routing paradigm table;

determining that the attribute information is the information on the using frequency of the at least one reconfigurable component, wherein coding the at least one reconfigurable component comprises:

A: sequencing the at least one reconfigurable component in descending order according to the using frequency of the at least one reconfigurable component to form a reconfigurable component sequence;

B: adding a virtual reconfigurable component with the using frequency equal to 0 into the reconfigurable component sequence;

C: combining two reconfigurable components with minimum using frequencies and constructing a binary tree by defining the two reconfigurable components with the minimum using frequencies as two leaves of the binary tree, wherein a using frequency of a root node of the binary tree is a sum of using frequencies of leaves of the binary tree;

D: adding the root node as a reconfigurable component into the reconfigurable component sequence;

E: repeating steps C and D until only one reconfigurable component is in the reconfigurable component sequence, resulting a Huffman tree being generated, wherein all reconfigurable components are defined as leaves of the Huffman tree;

F: defining codes of all left branches of the Huffman tree as 0 and codes of all right branches of the Huffman tree as 1; and G: generating the Huffman code of a reconfigurable component corresponding to a leaf of the Huffman tree by combining codes of branches in a path from the root node to the leaf.

6. The apparatus according to claim 5, further comprising:

a matching module, configured to push a generated behavior code into the routing paradigm table to match the generated behavior code in the routing paradigm table;

a performing module, configured to perform the routing function if the generated in the routing paradigm table is successfully matched;

a warning module, configured to giving an alarm if the generated behavior code is unsuccessfully matched.

7. The apparatus according to claim 6, wherein the warning module is configured to give an alarm if the generated behavior code is unsuccessfully matched by steps of:

obtaining a severity level of an illegal behavior corresponding to the generated behavior code if the generated behavior code is unsuccessfully matched;

disabling a reconfigurable component generating the illegal behavior until the reconfigurable component generating the illegal behavior is reactivated by a control layer if the severity level is a first level;

sending a warning message to an application layer directly if the severity level is a second level.

8. The apparatus according to claim 7, wherein the at least one reconfigurable component has an activate and disable interface resulting the control layer controls the at least one reconfigurable component via the activate and disable interface.

9. A non-transitory computer-readable storage medium having stored therein instructions that, when executed by a processor of a terminal, causes the terminal to perform a method for assembling a component in a router for running an application program, wherein the router comprises at least one reconfigurable component, the at least one reconfigurable component has a unique function, the method comprises steps of:

obtaining attribute information of the at least one reconfigurable component in the router, wherein the attribute information comprises information on an importance and/or a using frequency of the at least one reconfigurable component in the router;

coding the at least one reconfigurable component based on Huffman Coding to generate a Huffman code according to the attribute information of the at least one reconfigurable component;

selecting the at least one reconfigurable component, and assembling the selected reconfigurable component to realize a routing function and to form an assembly code; and generating a routing paradigm table according to a user security requirement and the assembly code, resulting the router performs the routing function according to the routing paradigm table;

determining that the attribute information is the information on the using frequency of the at least one reconfigurable component, wherein coding the at least one reconfigurable component comprises:

A: sequencing the at least one reconfigurable component in descending order according to the using frequency of the at least one reconfigurable component to form a reconfigurable component sequence;

B: adding a virtual reconfigurable component with the using frequency equal to 0 into the reconfigurable component sequence;

C: combining two reconfigurable components with minimum using frequencies and constructing a binary tree by defining the two reconfigurable components with the minimum using frequencies as two leaves of the binary tree, wherein a using frequency of a root node of the binary tree is a sum of using frequencies of leaves of the binary tree;

D: adding the root node as a reconfigurable component into the reconfigurable component sequence;

E: repeating steps C and D until only one reconfigurable component is in the reconfigurable component sequence, resulting a Huffman tree being generated, wherein all reconfigurable components are defined as leaves of the Huffman tree;

F: defining codes of all left branches of the Huffman tree as 0 and codes of all right branches of the Huffman tree as 1; and G: generating the Huffman code of a reconfigurable component corresponding to a leaf of the Huffman tree by combining codes of branches in a path from the root node to the leaf.

* * * * *